United States Patent
Patel et al.

(10) Patent No.: US 8,198,345 B2
(45) Date of Patent: *Jun. 12, 2012

(54) LUBRICIOUS ANAEROBIC CURABLE COMPOSITIONS

(75) Inventors: Prakash S. Patel, Algonquin, CT (US); Shabbir Attarwala, Simsbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/376,649

(22) PCT Filed: Aug. 1, 2007

(86) PCT No.: PCT/US2007/017261
§ 371 (c)(1), (2), (4) Date: Feb. 6, 2009

(87) PCT Pub. No.: WO2008/021014
PCT Pub. Date: Feb. 21, 2008

(65) Prior Publication Data
US 2010/0179078 A1 Jul. 15, 2010

Related U.S. Application Data

(60) Provisional application No. 60/822,112, filed on Aug. 11, 2006.

(51) Int. Cl.
*C09J 4/02* (2006.01)
*B05D 5/08* (2006.01)
*F16C 33/20* (2006.01)
*C10M 113/04* (2006.01)

(52) U.S. Cl. ........ 523/176; 427/384; 508/100; 508/116; 508/155; 508/178; 508/463

(58) Field of Classification Search .......... 508/100, 508/463, 116, 178, 175, 155; 427/384; 523/176
See application file for complete search history.

(56) References Cited

U.S. PATENT DOCUMENTS

| | | | |
|---|---|---|---|
| 3,996,143 A * | 12/1976 | Orkin et al. | 508/101 |
| 4,431,787 A | 2/1984 | Werber | |
| 4,460,760 A | 7/1984 | Okamoto et al. | |
| 4,497,916 A | 2/1985 | Cooke et al. | |
| 5,409,764 A | 4/1995 | Otsuki et al. | |
| 5,925,409 A * | 7/1999 | Nava | 427/238 |
| 6,272,728 B1 * | 8/2001 | Lenac et al. | 29/458 |
| 6,451,927 B1 | 9/2002 | Hass et al. | |
| 2003/0092863 A1 * | 5/2003 | Doi et al. | 528/25 |
| 2003/0096904 A1 * | 5/2003 | Hakuta et al. | 524/588 |
| 2003/0217808 A1 | 11/2003 | Woods et al. | |

OTHER PUBLICATIONS

International Search Report dated Dec. 14, 2007.

* cited by examiner

*Primary Examiner* — Walter D Griffin
*Assistant Examiner* — Vishal Vasisth
(74) *Attorney, Agent, or Firm* — Steven C. Bauman

(57) ABSTRACT

The present invention relates to lubricious anaerobic curable compositions.

10 Claims, No Drawings

LUBRICIOUS ANAEROBIC CURABLE COMPOSITIONS

This application is a 371 of PCT/US07/17261, filed Aug. 1, 2007 which claims benefit of 60/822,112, filed Aug. 11, 2006.

BACKGROUND OF THE INVENTION

1. Field of the Invention

The present invention relates to lubricious anaerobic curable compositions.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Many times, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g., U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Anaerobic curable compositions are oftentimes used as thread lockers. In such use, lubricity is desired, but conventional thread lockers fall short, particularly in terms of clamp load. Insufficient clamp load means that a higher torque is required for disassembly of the nut and bolt assembly. Higher torque may go beyond the manufactures' recommended specification.

U.S. Pat. No. 5,498,351 (Heffling) claims a process for making anti-seize lubricant compositions, and sets forth compositions of this type which include naphthenic oil, lubricating grease, graphite, silicon fluid, and metal flake/oil suspension (65% aluminum flake and 35% oil).

It would be desirable to provide anaerobic curable compositions with lubricity to prevent seizing of threaded fasteners.

SUMMARY OF THE INVENTION

The present invention provides anaerobic curable compositions with lubricity. The anaerobic curable compositions are typically used as adhesives or sealants.

The anaerobic curable compositions include (a) a (meth)acrylate component; (b) an anaerobic cure-inducing composition; and (c) a lubricious agent.

The addition of these materials into anaerobic curable compositions as a replacement for some or all of the amount of conventional anaerobic cure accelerators (such as o-benzoic sulfimide or saccharin, used interchangeably throughout) and/or aromatic amines (such as toluidines like diethyl-p-toluidine and dimethyl-o-toluidine) surprisingly provides at least comparable cure speeds and physical properties for the reaction products formed therefrom.

This invention also provides anaerobic curable compositions and anaerobic curable composition systems prepared with such lubricious agents, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

The present invention provides anaerobic curable composition having lubricity.

Anaerobic curable compositions generally are based on a (meth)acrylate component, together with an anaerobic cure-inducing composition. In the present invention, such anaerobic curable compositions also include a lubricious agent to impact lubricity on the cured reaction product. Such lubricity decreased the torque required at a pre-determined tension.

The lubricious agent may be selected from graphite, calcium oxide, calcium carbonate, calcium fluoride, calcium stearate, magnesium oxide, magnesium carbonate, magnesium fluoride, magnesium stearate, boron nitride, polyethylene, polypropylene, polytetrafluoroethylene and combinations thereof. A particularly desirable combination includes graphite and polyethylene.

Commercially available examples and specifications of such lubricious agents include those from Superior Graphite under the trade designation Graphite 5539 (particle size: 90% minimum, 20 micron, Ash: 02%, max); Mississippi Lime under the tradename QUICK LIME (fine white powder, particle size 325 mesh or lower); Pluss Staufer under the tradename ATOMFOR S (particle size: 99% smaller than 325 mesh, specific gravity: 2.71); Seaforth Mineral under the tradename FLUORSPAR SUPERFINE (specific gravity: 3.81, solubilityin water: 16 mg/l); Witco, under the trade designation name Calicum Stearate Regular (white powder, slightly fatty odor, melting point: 106° C., specific gravity: 1.03); Kyowa Chemical under the tradename PYROKISMA 530 IJ (white powder, MgO: 93.8, heat loss: 0.930); Dolomia Ltd under the tradename DOLOMITA #325 TB (particle size 325 mesh); Spectrum Chemical as magnesium fluoride (particle size: 325 mesh); CP Hall as magnesium stearate (white powder, specific gravity: 1.028, particle size: 325 mesh); Advanced Ceramics under the trade designation Boron Nitride HCP GRADE (particle size: 7-10 micron, 99% passes through 325 mesh, density: 0.4 g/cc, moisture: 0.15%); Equistar Chem under the tradename MICROTHENE FN-510 (fine powder, particle size: 15% max, retained 270 mesh); Eastman Chemical under the tradename POLENE N-15 WAX (white solids, specific gravity: 0.62); and Dupont under the tradename ZONYL MP 1300 (specific gravity: 2.1-2.3).

(Meth)acrylate monomers suitable for use as the (meth)acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran(meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone(meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, other free radical co-accelerators, inhibitors of free radical generation, as well as metal catalysts, such as iron and copper.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional accelerators of free radical polymerization may also be used in conjunction with the inventive anaerobic cure accelerators. Such co-accelerators are typically of the hydrazine variety (e.g., APH), as disclosed in the '330 and '349 patents.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

Anaerobic cure accelerators may be used in amounts of about 0.1 to about 5 percent by weight, such as about 1 to about 2 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 2 percent by weight.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate.

In addition, this invention provides a method of preparing an anaerobic curable composition, a step of which includes mixing together a (meth)acrylate component, and an anaerobic cure-inducing composition and a lubricious agent.

The invention also provides a process for preparing a reaction product from the anaerobic adhesive composition of the present invention, the steps of which include applying the composition to a desired substrate surface and exposing the composition to an anaerobic environment for a time sufficient to cure the composition.

In view of the above description of the present invention, it is clear that a wide range of practical opportunities is provided. The following examples are provided for illustrative purposes only, and are not to be construed so as to limit in any way the teaching herein.

EXAMPLES

Adhesive Formulations

Generally, lubricious anaerobic curable compositions in accordance with this invention may be prepared with these representative components in the by weight ranges noted in Table 1. Of course, various alternative materials may be substituted for or included in addition to those listed below, examples of which are given throughout the application.

TABLE 1

| | |
|---|---|
| Polyethylene Glycol Dimethacrylate | 40-80 |
| Bisphenol A Fumarate | 10-40 |
| Napthoquinone | 0.01-0.1 |
| Tetrasodium Ethylenediamine Tetraacetate | 0.01-0.1 |
| Saccharin | 0.5-2.0 |
| Diethyl p Toluidine | 0.2-1.0 |
| Dimethyl o Toluidine | 0.2-1.0 |
| Peroxide | 0.2-10 |
| Hydroxy Propyl Methacrylate | 2-10 |
| Synthetic Graphite | 5-30 |
| Polyethylene powder | 5-30 |

More specifically, Sample No. 1 as set forth in Table 2 was prepared from the noted components in the listed amounts, by mixing with a mechanical stirrer in glass vials.

TABLE 2

| COMPONENTS | | |
|---|---|---|
| Type | Identity | Amt./wt % |
| (Meth)acrylate | Polyethylene Glycol Dimethacrylate | 48.17 |
| | Propoxylated Bisphenol A Fumarate | 35.15 |
| Chelater | NaEDTA | 0.04 |
| Toluidines | DE-p-T | 0.46 |
| | DM-o-T | 0.23 |
| Peroxide | CHP | 1.75 |
| Accelerator | Saccharin | 1.346 |
| Lubricious Agent | Graphite* | 7.00 |
| | Polyethylene** | 5.00 |

*Commercially available from Superior Graphite Co., Chicago, IL, as 5539 graphite
**Commercially available from Equistar Chemicals Co., Houston, TX, under the tradename MICROTHENE Fn 510

Sample No. 2 as set forth in Table 3 was prepared as a control from the noted components in the listed amounts, also by mixing with a mechanical stirrer in glass vials.

TABLE 3

| COMPONENTS | | |
|---|---|---|
| Type | Identity | Amt./wt % |
| (Meth)acrylate | Polyethylene Glycol Dimethacrylate | 53.30 |
| | Propoxylated Bisphenol A Fumarate | 39.93 |
| Dye | Red | 0.06 |
| | Fluorescent | 0.0002 |
| Chelater | NaEDTA | 0.04 |
| Toluidines | DE-p-T | 0.53 |
| | DM-o-T | 0.27 |
| Peroxide | CHP | 1.99 |
| Accelerator | Saccharin | 1.53 |

Physical Properties

Initially, we determined the compressive shear strength for anaerobic curable compositions using degreased steel pins and collars. The results for Sample Nos. 1 and 2 are set forth below in Table 4.

TABLE 4

| | Shear Strength (N/mm$^2$) | |
|---|---|---|
| Sample No. | 1 Hour | 24 Hours |
| 1 | 7.2 | 18.9 |
| 2 | 5.7 | 11.7 |

Next, we considered lubricity and k factor in the determination of the amount of applied torque at predetermined bolt tensions for anaerobic curable compositions. The nuts and bolts used in this evaluation were constructed of ⅜"×16 phosphate steel, and were as received, and thus oily on the surface. Table 5 sets forth the data obtained with respect to the control composition and Table 6 sets forth the data obtained with respect to an inventive composition.

TABLE 5

| TORQUE DETERMINATION @ SPECIFIED TENSION LUBRICITY & K-FACTOR | | | |
|---|---|---|---|
| Bolt Tension (lbs.): 5000 | | Bolt Tension (lbs.): 6000 | |
| Applied Torque (in.-lbs.) | K Factor | Applied Torque (in.-lbs.) | K Factor |
| 546 | 0.29 | 659 | 0.29 |
| 559 | 0.30 | 656 | 0.29 |
| 540 | 0.29 | 619 | 0.28 |
| 552 | 0.29 | 670 | 0.30 |
| 580 | 0.31 | 692 | 0.31 |
| Average: 555 | 0.30 | Average: 659 | 0.29 |

TABLE 6

| TORQUE DETERMINATION @ SPECIFIED TENSION LUBRICITY & K-FACTOR | | | |
|---|---|---|---|
| Bolt Tension (lbs.): 5000 | | Bolt Tension (lbs.): 6000 | |
| Applied Torque (in.-lbs.) | K Factor | Applied Torque (in.-lbs.) | K Factor |
| 400 | 0.21 | 469 | 0.21 |
| 449 | 0.24 | 412 | 0.18 |
| 391 | 0.21 | 437 | 0.19 |
| 317 | 0.17 | 367 | 0.16 |
| 416 | 0.22 | 490 | 0.22 |
| Average: 395 | 0.21 | Average: 435 | 0.19 |

The lubricious anaerobic composition (Sample No. 1) shows higher lubricity (in terms of a lower K factor) than the control anaerobic composition (Sample No. 2) at each of 5000 lbs. and 6000 lbs. tension. This allows the assembly to achieve higher clamping loads at lower installation torques.

What is claimed is:

1. A lubricious anaerobic curable composition, consisting essentially of:
   (a) a (meth) acrylate component;
   (b) an anaerobic cure-inducing composition; comprising saccharin and toluidine; and
   (c) a particulate lubricious agent comprising the combination of graphite having a particle size of less than 325 mesh and polyethylene; and
   (d) optionally, one or more additives selected from the group consisting of free radical initiators, free radical accelerators, free radical inhibitors, metal catalysts, thickeners, plasticizers, fillers, and toughening agents.

2. The composition according to claim 1, wherein the (meth)acrylate component is represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition according to claim 1, wherein the (meth)acrylate component is a member selected from the group consisting of silicone (meth)acrylates, polyethylene glycol di(meth)acrylates, bisphenol-A-(meth)acrylates, alkoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. Cured reaction products of the composition according to claim 1.

5. A process for preparing a reaction product from an anaerobic curable composition, comprising the steps of:

apply an anaerobic curable composition according to claim 1, to a desired substrate surface and exposing the composition to an anaerobic environment for a time sufficient to cure the composition.

6. A method of preparing a lubricious anaerobic curable composition in accordance with claim 1, comprising the step of:

mixing together:

a (meth)acrylate component, an anaerobic cure inducing composition and a lubricious agent.

7. A composition comprising a bond formed between two mated substrates with the composition of claim 1.

8. The composition according to claim 1, where each of graphite and polyethylene are present in a range of 5-30% by weight.

9. The composition according to claim 1, combination of graphite and polyethylene in a by weight ratio of about 1:1.

10. The composition according to claim 1, wherein the graphite has a specific gravity between 0.62-2.71.

* * * * *